E. B. MOORE.
STEREOSCOPIC MOTION PICTURE MECHANISM.
APPLICATION FILED AUG. 7, 1916.

1,396,651.

Patented Nov. 8, 1921.

WITNESSES:

INVENTOR
Edgar Blackburn Moore

UNITED STATES PATENT OFFICE.

EDGAR BLACKBURN MOORE, OF LOS ANGELES, CALIFORNIA.

STEREOSCOPIC-MOTION-PICTURE MECHANISM.

1,396,651.     Specification of Letters Patent.     Patented Nov. 8, 1921.

Application filed August 7, 1916. Serial No. 113,535.

*To all whom it may concern:*

Be it known that I, EDGAR BLACKBURN MOORE, a citizen of the United States, residing at Los Angeles, in the county of Los Angeles and State of California, have invented a new and useful Improvement in Stereoscopic-Motion-Picture Mechanisms, of which the following is a specification.

My invention relates to a mechanism whereby a pair of stereoscopic pictures, or two stereoscopic series of motion pictures, can be projected on a screen and the binocular effect of depth and solidity observed by all in the audience.

Briefly, the mechanism projects one of a pair of stereoscopic pictures, then the other alternately on a screen in rapid succession; and a rotary shutter, operated by a synchronous electric motor, over each eye is run in synchronism with the above alternation of pictures on the screen, so that the image of the right stereoscopic picture is admitted to the right eye only and the left picture to the left eye only. Devices similar to the above have been constructed, employing mechanical rotary or electrically produced reciprocating motion of the shutters; but the novelty of this invention lies in the combination of rotary shutters and synchronous electric motors, whereby exact synchronism is preserved at a high speed thus giving an improved stereoscopic effect.

Figure 1:
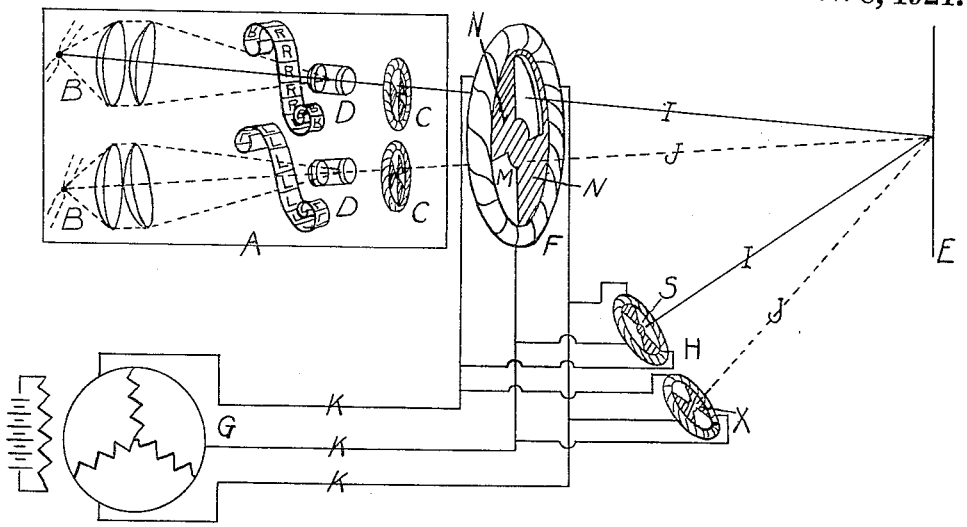
Figure 2:
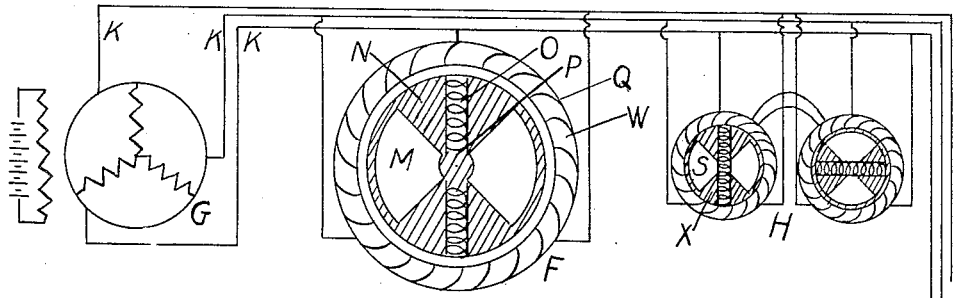

In the accompanying drawings: Figure 1 is a perspective view showing the stereoscopic motion picture mechanism F, H, G, K, attached to the duplex motion picture projecting machine A; Fig. 2 is an elevation of the mechanism comprising this invention.

Similar letters refer to similar parts throughout the several views.

Referring to Fig. 1, A represents a duplex motion picture projecting machine in which B represents the arc lights and condensing lenses, D the projecting lenses, C the rotary shutters to obscure image on screen while films move. The above are merely parts of a motion picture machine and form no part of this invention. The shutter C has no reference to the rotary shutters described later and forming part of this invention. The picture film strip R and L are the series of right and left stereoscopic motion pictures respectively or a single pair of stereoscopic lantern slides. These are projected on the screen E and are apparently superimposed forming a confused picture when viewed by the eyes alone. I and J represent the path of an single light ray from each picture. F is a rotary shutter so constructed as to alterately obstruct and allow to pass each of the above light rays, N being the opaque and M the transparent part of the rotary disk, said disk being run by the synchronous electric motor described later. H represents a binocular eye piece shutter with two rotary disks composed of opaque and transparent parts X and S respectively. These latter disks are rotated synchronically with F by synchronous electric motors also. On a motion picture machine the shutters F and H, usually rotate much faster than the shutters C on a motion picture machine thus giving a better effect, though they can be operated at the same speed. As shown in the drawing the picture R will be projected on the screen, the light I from it passing through the transparent part of the disk F at M, and reflecting from screen E on the two eye piece disks, H will pass to the eye back of transparent part S but will be cut off from the other eye back of opaque part X so the right eye will see the right picture only. When the disk F has rotated slightly the ray I from R will be cut off and the ray J from L will be allowed to pass and as the disks in the eye piece H rotate synchronically the image of L will pass to the left eye but not to the right eye and so on. Hence the right eye only will see the right picture strip as it advances and the left eye the left picture strip only, consequently it produces the effect of stereoscopic vision.

The generator G can be any form of generator that is capable of operating motors synchronically so as to rotate the shutters F and H synchronically. The wires K join the motors electrically. While the illustration shows a duplex motion picture projector, this stereoscopic mechanism can be used on any type that can project stereoscopic pictures, those composed of two lanterns placed horizontally or vertically, or those composed of one lantern with stereoscopic photos alternating on strip of film, or it may be used on a stereopticon.

The motor on F may be used as the generator, the power being supplied from an external source, and the current used to run the rotary shutter eye piece H synchronically, the generator G being displaced but on large installations the former method is preferred. Two shutters in place of the one shown at F may be used if they run synchronically.

As above stated the shutters F and H rotate synchronically by synchronous electric motors and herein lies the novelty of this invention, not in the rotary shutters nor the electric method of producing synchronism, but the combination of rotary shutters and electric motors, capable of running same synchronically.

Referring to Fig. 2, the generator G may be of any type capable of running motors in synchronism, a direct current, a direct current intermittent, a single phase alternating, or a polyphase alternating. On account of their property of producing a rotary magnetic field, thus giving synchronic rotation and being self starting, the polyphase alternating type is preferred and of these either the quarter phase or the three phase is generally used. The illustrations are of the three phase type. The foregoing refers to the motor that operates the shutter as well as the generator.

The rotary shutter F as illustrated is composed of a rotary disk with two open sectors M and two opaque sectors N, across the disk runs the steel or soft iron strip or rod P, closed coils of a conductor O are wound around same, the rim W is composed of iron wound with coils Q, projecting pole pieces are usually provided as it produces more exact synchronism. As shown in the illustration the wires from the generator G are connected to coils at three equidistant points thus making three coils but there may be any multiple of these for three phase and varies according to what phase is used. The rotating magnetic field induces electric currents in the closed coils O which start the disk rotating, the action being the same as an induction motor, but when the rotation of the disk reaches synchronism, the iron is magnetized by induction and then follows the rotating magnetic field in exact synchronism the same as a synchronous polyphase motor. The rotary eyepieces in H are constructed the same as F only smaller. The binocular eyepiece is composed of two such disks, one over each eye, and is constructed with supports as ordinary spectacles. The disks are run in such a position that a line drawn through one of two opaque sectors will be at right angles to a line drawn through the two opaque sectors of other disk, so that at a given time light will be admitted to one eye through one shutter and shielded from the other eye by the other shutter. One rotary disk to cover both eyes may be used but the binocular shutter as described above is preferred. The form of rotary shutter is not confined to model described but may be of any convenient form comprising rotary shutter combined with synchnonous electric motor. The motors of the rotary shutters F and H are connected to the generator G by the wires K K K so that the motors run in synchronism with G or some multiple or factor of it. There are supposed to be as many eye piece shutters H as there are observers. The rotary disk may be composed of two opaque and two transparent sectors as shown in Fig. 2 at F but it is not confined to this exact form. However this form is preferred as the disks in each eyepiece start at right angles without the use of polarized rotors.

I claim:

1. A binocular eyepiece comprising two viewing means, one for each eye, each viewing means including a stationary rim and a rotary shutter, the rim comprising the stator and the rotary shutter comprising the rotor of a polyphase electric motor, the rotary shutters being arranged so that one shutter will admit the light to one eye while the other shutter shuts out the light to the other eye.

2. A mechanism, consisting of a rotary eyepiece light shutter with the rim, or the fixed part of the same containing the stator of a polyphase electric motor, the rotating disk of the above shutter corresponding to the rotor of the above motor.

3. In combination, a projector shutter including a stationary rim and a rotary shutter element, the rim comprising the stator, and the rotary element comprising the rotor of a polyphase electric motor; a binocular eyepiece having two viewing means, one for each eye, each viewing means including a stationary rim and a rotary element of the same construction as the said projector shutter; and means for operating the shutter elements in synchronism.

EDGAR BLACKBURN MOORE.

Witnesses:
A. H. MOORE,
J. E. STARBUCH.